US006128299A

United States Patent [19]

Greaves

[11] Patent Number: 6,128,299

[45] Date of Patent: Oct. 3, 2000

[54] SYSTEM FOR LOW-COST CONNECTION OF DEVICES TO AN ATM NETWORK

[75] Inventor: David James Greaves, Cambridge, United Kingdom

[73] Assignee: Virata Ltd., Cambridge, United Kingdom

[21] Appl. No.: 08/707,987

[22] Filed: Aug. 23, 1996

[51] Int. Cl.[7] .......................... H04L 12/28; H04L 12/403

[52] U.S. Cl. ........................................... 370/395; 370/450

[58] Field of Search .................................... 370/232, 233, 370/395, 401, 450, 466, 222, 223, 258, 346, 349, 389, 392, 400, 403, 404, 405, 406, 422, 424, 434, 452, 463, 309; 395/200.02, 309, 200.13

[56] References Cited

U.S. PATENT DOCUMENTS

| | | | |
|---|---|---|---|
| 4,380,063 | 4/1983 | Janson et al. . | |
| 4,549,291 | 10/1985 | Renoulin et al. . | |
| 5,041,963 | 8/1991 | Ebersole et al. . | |
| 5,241,635 | 8/1993 | Papadopoulos et al. . | |
| 5,388,097 | 2/1995 | Baugher et al. . | |
| 5,446,726 | 8/1995 | Rostoker et al. | 370/395 |
| 5,490,140 | 2/1996 | Abensour et al. | 370/471 |
| 5,506,847 | 4/1996 | Shobatake . | |
| 5,524,000 | 6/1996 | Yoshimura et al. . | |
| 5,592,622 | 1/1997 | Isfeld et al. | 395/200.37 |
| 5,625,625 | 4/1997 | Oskouy et al. | 370/395 |
| 5,654,962 | 8/1997 | Rostoker et al. | 370/232 |
| 5,668,811 | 9/1997 | Worsley et al. | 370/424 |
| 5,708,659 | 1/1998 | Rostoker et al. | 370/392 |
| 5,719,862 | 2/1998 | Lee et al. | 370/355 |
| 5,802,056 | 9/1998 | Ferguson et al. | 370/403 |

FOREIGN PATENT DOCUMENTS

| | | |
|---|---|---|
| 0 365 864 A2 | 5/1990 | European Pat. Off. . |
| 0 472 380 A1 | 2/1992 | European Pat. Off. . |

*Primary Examiner*—Chau Nguyen
*Assistant Examiner*—Chiho Andrew Lee
*Attorney, Agent, or Firm*—Pennie & Edmonds LLP

[57] ABSTRACT

A system for connecting low-cost, simple peripherals to an ATM network is disclosed. A plurality of such devices is connected to a standard ATM switch in a ring configuration. A polling station, located remotely in the ATM network, periodically generates a token cell which is delivered to the switch and, thereafter, is transmitted onto the ring configuration. The devices transmit cells in response to the token cells by transmitting cells behind the token cell as they forward it around the ring. The resultant cell chain is received at the ATM switch, where the cells are then sent onto the ATM network using virtual circuits.

15 Claims, 7 Drawing Sheets

140
150
ATM NETWORK
114
112
110
120-1
130
122
124
120-2
120-3
120-4
120-5
100

100
110
112
114
120-1
120-2
120-3
120-4
120-5
122
124
130
140
150
ATM NETWORK

SYSTEM FOR LOW-COST CONNECTION OF DEVICES TO AN ATM NETWORK

TECHNICAL FIELD

The present invention relates generally to data communication networks and, more particularly, to the connection of low-cost, simple peripherals to asynchronous transfer mode networks.

BACKGROUND OF THE INVENTION

Asynchronous Transfer Mode ("ATM") is an emerging packet switching network technology designed to provide service for a wide variety of applications such as voice, video and data. Originally proposed for use in the Broadband Integrated Services Digital Network ("B-ISDN") by the International Telegraph and Telephone Consultative Committee ("CCITT"), now reorganized as the Telecommunications Standardization Sector of the International Telecommunication Union ("ITU-T"), ATM is presently moving beyond the wide area network setting into the private network arena as a platform for local area networks ("LANs") with multimedia capabilities. ATM is now well known in the art and is described in various references. E.g., Martin de Prycker, *Asynchronous Transfer Mode: Solution for Broadband ISDN* (2nd Ed., Ellis Horwood Ltd., West Sussex, England, 1993).

In an ATM network, as defined by the CCITT standards, information is carried in packets of fixed size, specified for B-ISDN as 53 bytes or octets, called cells. These cells are individually labelled by addressing information contained in the first 5 bytes (octets) of each cell. Although ATM evolved from Time Division Multiplexing concepts, cells from multiple sources are statistically multiplexed into a single transmission facility. Cells are identified by the contents of their headers rather than by their time position in the multiplexed stream. A single ATM transmission facility may carry hundreds of thousands of ATM cells per second originating from a multiplicity of sources and travelling to a multiplicity of destinations.

ATM is a connection-oriented technology. Rather than broadcasting cells onto a shared wire or fiber for all network members to receive, a specific routing path through the network, called a virtual circuit, is set up between two end nodes before any data is transmitted. Cells identified with a particular virtual circuit are delivered to only those nodes on that virtual circuit.

The backbone of an ATM network consists of switching devices capable of handling the high-speed ATM cell streams. The switching components of these devices, commonly referred to as the switch fabric, perform the switching function required to implement a virtual circuit by receiving ATM cells from an input port, analyzing the information in the header of the incoming cells in real-time, and routing them to the appropriate destination port.

The deterministic nature of ATM makes it ideally suited for carrying multimedia or other real-time information, creating the opportunity to interconnect a wide variety of devices or equipment which generate or employ such information. For instance, an array of video surveillance cameras or motion sensors in an office building could be interconnected via an ATM network to efficiently deliver video images and other data to a common security control point. Further applications consist of the control and monitoring of devices in a residential or commercial setting. An individual may wish to program and/or monitor a microwave, refrigerator, clock, climate control, VCR, coffee maker, alarms, or other devices from one location in the home or at a remote location. A computer, either in the home or at a remote location, could use information from such devices to compile and transmit a shopping list, call a service specialist for the repair of a malfunctioning device, alert police to a security breach, or simply inform the homeowner of anything unusual or interesting.

Unfortunately, the current interfaces required for connection to ATM networks make the use of these networks with such simple peripherals prohibitively expensive. The major problem lies with current ATM protocols which require that the switches and end stations support vast quantities of signalling and management software, including a base set consisting of Q.2931, SSCOP, and SNMP. For a large class of possible simple ATM devices, such as those described above, the memory and processors required to implement these protocols is more expensive than the sum of the cost of the actual data handling components. Conceivably, lightweight versions of these protocols could be developed which would reduce the processing power necessary to implement an ATM interface for a simple device. However, even these protocols would require a minimum of software support which would be too costly for a large class of applications. Indeed, many devices could not be cost-effectively integrated into an ATM network unless fully-hardware interfaces could be employed. Furthermore, even if the necessity for this software support could be eliminated, the buffering in current ATM interfaces, in itself, could be prohibitively expensive.

Therefore, there exists a need for a mechanism to connect a number of simple peripherals to an ATM network using low-cost interfaces. Such interfaces would permit these devices to transmit and receive standard ATM cells without significant buffering, and without need to support current ATM protocols.

SUMMARY OF THE INVENTION

The present invention is directed to a communication system for connecting lowcost, simple peripherals to an ATM network. The system comprises a plurality of these simple peripheral devices interconnected in series by a communication link. A switch connects the communication link to the ATM network, such that the communication link begins and terminates at the switch so as to form a ring. In this manner, cells transmitted by any of the plurality of peripheral devices are delivered to the switch and then further transmitted by the switch onto the ATM network. Specifically, each peripheral device comprises an input port for receiving data and an output port for transmitting data. The ATM switch comprises a duplex switch port having an input connection for receiving data and an output connection for transmitting data, where the output connection is connected to the input port of the first of the plurality of peripheral devices, each input port of the other peripheral devices is connected to the output port of the previous peripheral device, and the output port of the last peripheral device is connected to the input connection of the duplex switch port. Each of the plurality of peripheral devices transmits data received at its input port on its output port, so that data progresses around the communication link and is ultimately received at the switch.

In accordance with another aspect of the invention, a token cell is transmitted from the ATM switch onto the communication link, where it is received and forwarded by each of the plurality of peripheral devices, and ultimately returned to the switch. Each peripheral device transmits cells in response to the token cell. In one embodiment, each peripheral device may transmit a cell after transmitting the token cell and the existing chain of cells previously transmitted by other devices. In another embodiment, each peripheral device may transmit a cell immediately following the token cell, thereafter transmitting the existing cell chain.

In accordance with another aspect of the invention, the token cell is generated by a polling station. The polling station may be located at the ATM switch, but will most likely be a process running on a computer elsewhere in the ATM network connected to the ATM switch by one or more virtual channel connections.

In accordance with another aspect of the invention, the peripheral devices are addressed using address fields in the cell headers. Furthermore, these address fields are algebraically manipulated as they pass through each peripheral device, thereby permitting devices to be addressed by their relative positions along the communication link.

In this manner, low-cost, simple peripheral devices can be connected to an ATM network without need to support current ATM protocols.

BRIEF DESCRIPTION OF THE DRAWINGS

A more complete understanding of the invention may be obtained by reading the following description in conjunction with the appended drawings in which like elements are labeled similar y and in which.

DETAILED DESCRIPTION OF THE INVENTION

In the following description, numerous specific details are set forth in order to provide a thorough understanding of the present invention. It will be obvious, however, to one skilled in the art that the present invention may be practiced without these specific details. In other instances, well-known circuits, structures and techniques have not been shown in detail in order not to unnecessarily obscure the present invention.

Furthermore, although what is described herein is a mechanism for connecting lowcost, simple peripherals to an ATM network, it should be understood that the present invention is in no way limited in applicability to ATM networks as defined by the CCITT. Rather, one skilled in the art will recognize that the invention described herein may be employed in a wide variety of packet switching networks. For examples of some alternative networks, see de Prycker, pp. 50–58.

Figure 1:
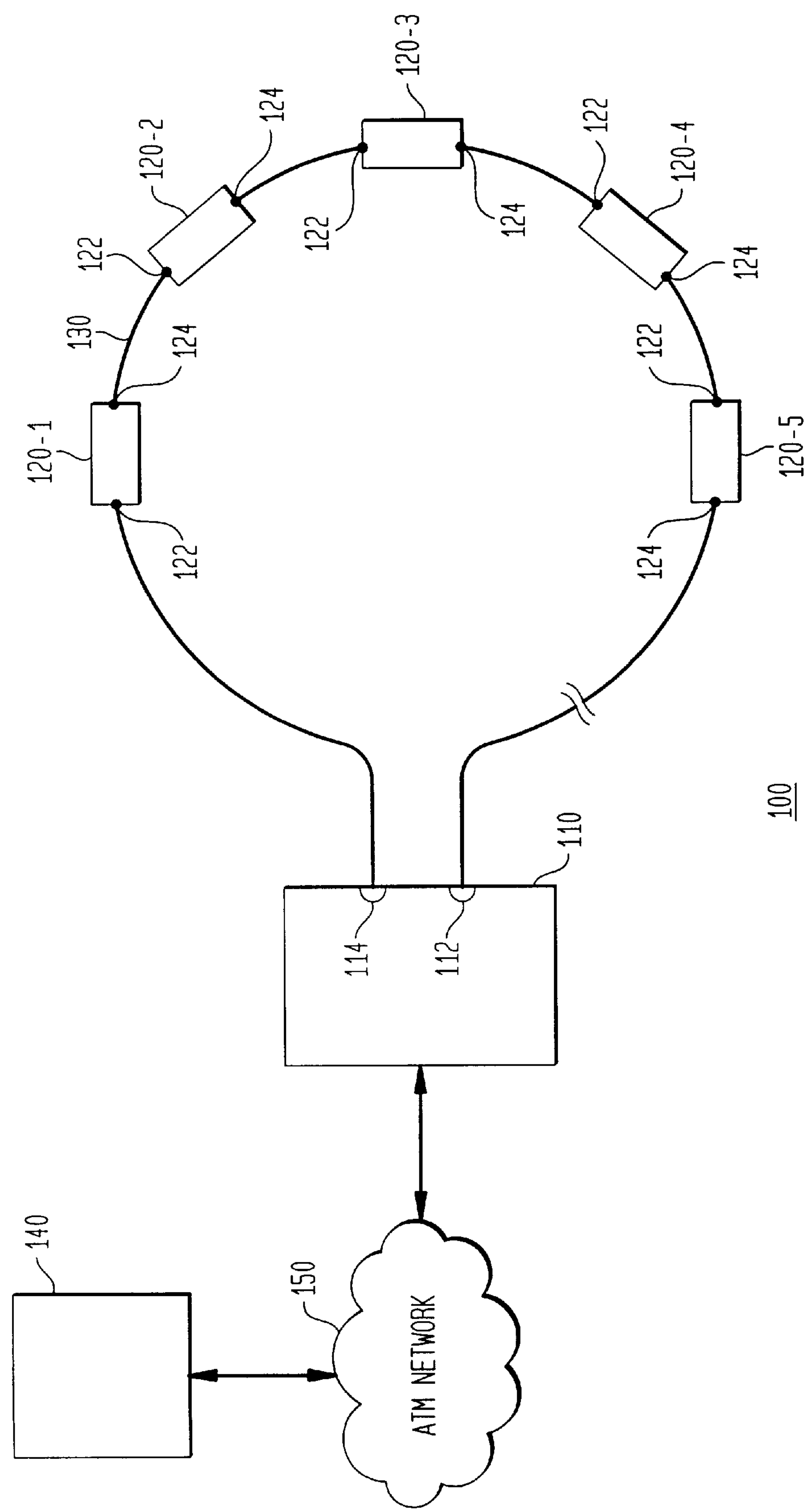
FIG. 1 is a diagram of an embodiment of a communication system constructed in accordance with the principles of the present invention.

A basic block diagram of a communication system 100 constructed in accordance with the principles of the present invention is shown in FIG. 1. Communication system 100 comprises a duplex ATM switch port 110 connected to a plurality of simple peripherals or devices 120 interconnected in a ring structure by communication link 130. Each device 120 has an input port 122 and output port 124. Likewise, duplex ATM switch port 110 has output connection 114 and input connection 112. Output connection 114 is connected via communication link 130 to input port 122 of first device 120-1. Input ports 122 of each of the following devices 120 are connected via communication link 130 to output port 124 of previous device 120, and output port 124 of last device 120 on the ring, device 120-5 in FIG. 1, is connected to input connection 112 of switch port 110. Polling station 140 communicates with devices 120 through switch port 110 via ATM network 150.

The wiring of communication link 130 may be easily implemented using unshielded twisted pair cabling (UTP), such as the cabling employed in the ATM25.6 standard. Those of ordinary skill in the networking field will appreciate that a wide variety of cabling and physical media may be employed to achieve the network topology depicted in FIG. 1. However, it will be recognized that since one of the primary goals sought to be achieved by the present invention is the reduction of expense associated with networking arrays of simple devices, a low-cost physical medium should be chosen. The physical medium of the IBM 802.4 Token Ring standard is well-suited for this purpose.

Figure 2A:
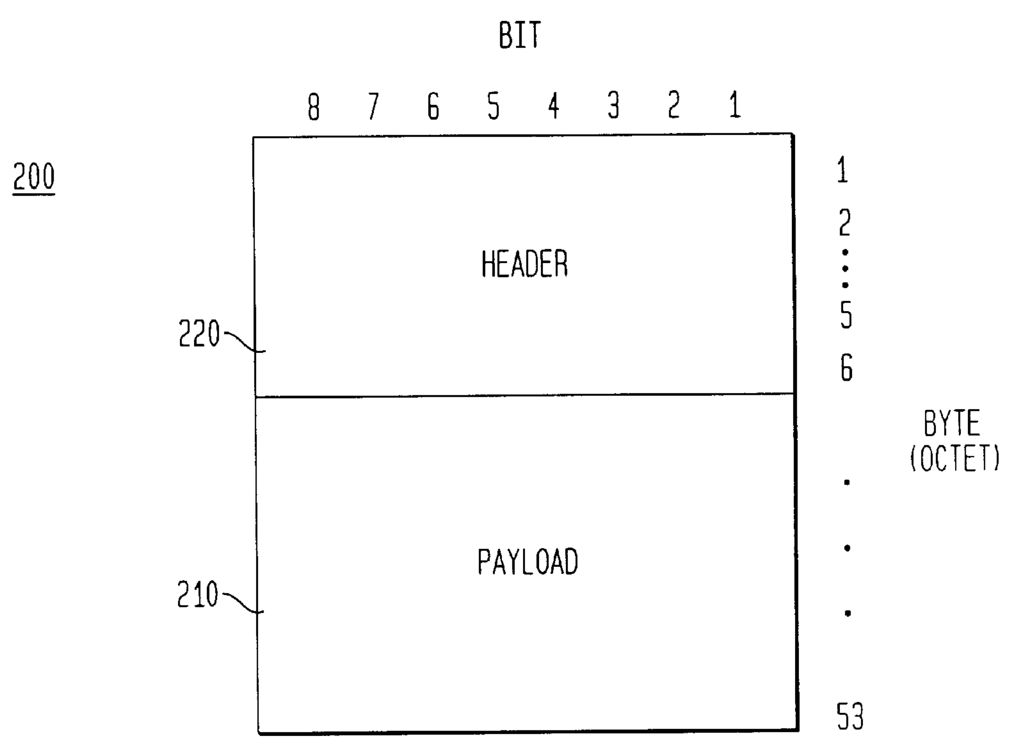
FIG. 2A is a diagram of an ATM cell as defined by the CCITT.

Although not necessary to the invention, standard ATM cells are employed throughout the preferred embodiment of the present invention. Therefore, as an aid to understanding the invention, a description of a typical ATM cell is as follows. FIG. 2A shows the format of an ATM cell 200 as defined in CCITT Recommendation I.361. This format, adopted for use in B-ISDN and other wide area networks, specifies a cell of 53 bytes (octets): an information field or payload 210 of 48 bytes (octets) which contains the user information which is the object of the transmission and a cell header 220 of 5 bytes (octets).

Figure 2B:
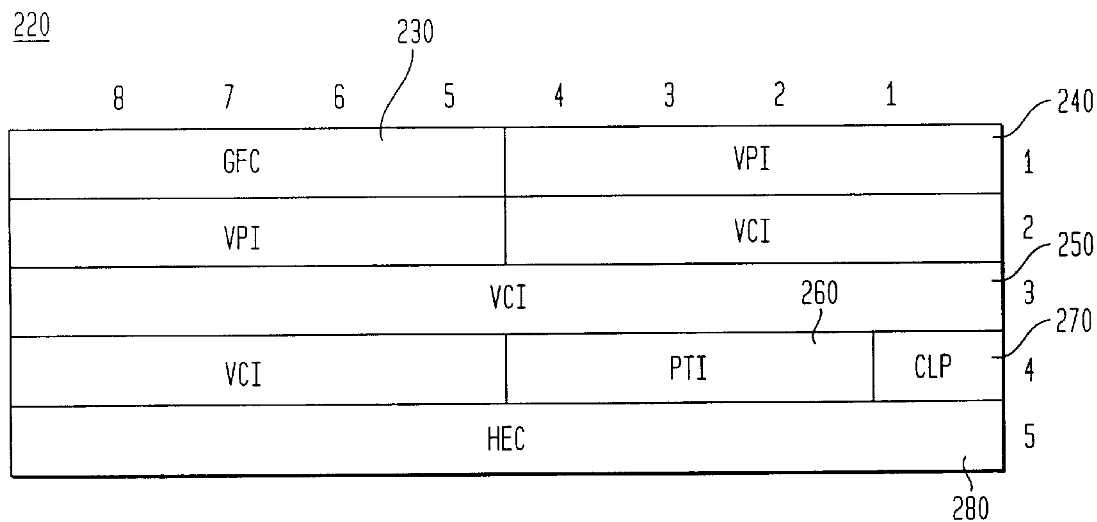
FIG. 2B is a diagram of an ATM cell header at the User-Network Interface as defined by the CCITT.

Cell header 220, or simply "header", is used for transmitting a variety of control information regarding the instant cell. FIG. 2B shows the structure of this header at the User-Network Interface (UNI), that is the interface between an end-user device and an ATM switch. Here the header is made up of a Generic Flow Control (GFC) field 230 for specifying information which may be used to control traffic flow at the user-network interface, a VPI (virtual path identifier) 240, a VCI (virtual circuit identifier) 250, a payload type 260 which provides information regarding the type of information contained in the payload area 210 of the cell, a cell loss priority bit 270 for setting the priorities relating to the abandonment of the cell during overload conditions, and a Header Error Control field 280 which contains an error control check byte for the previous four bytes (octets) in header 220.

Figure 2C:
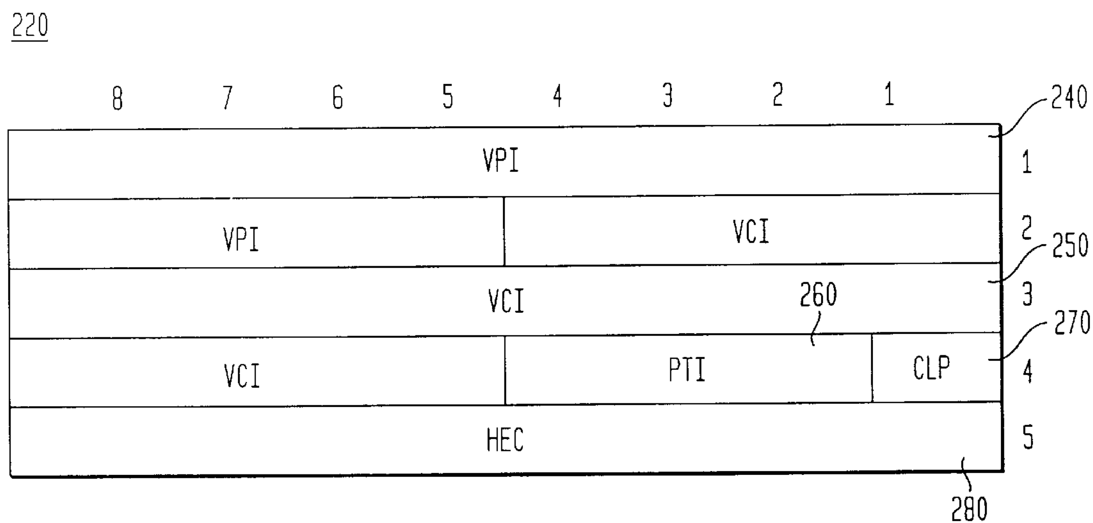
FIG. 2C is a diagram of an ATM cell header at the Network-Network Interface as defined by the CCITT.
Figure 3A:
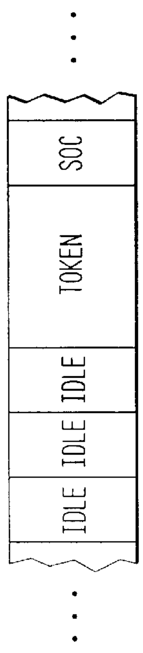
FIG. 3 (FIGS. 3A–3D) is an illustration of an example cell chain transmitted on a first embodiment of the communication system of FIG. 1 using an unslotted physical layer.
Figure 3B:
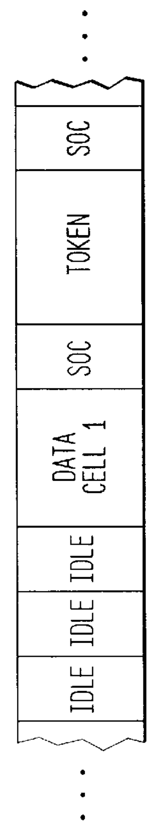
Figure 3C:
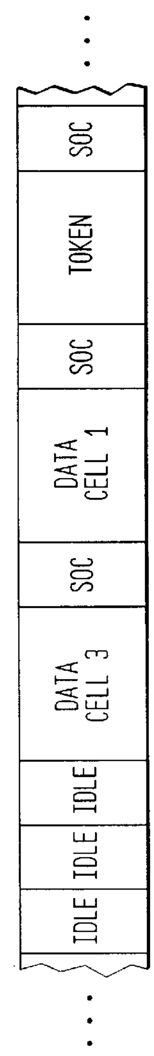
Figure 3D:
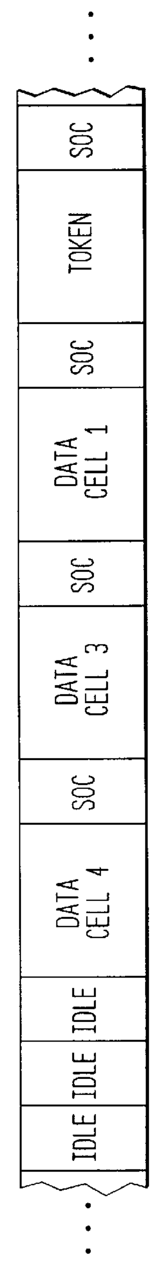

FIG. 2C shows the format of header 220 at the Network-to-Network Interface (NNI), the interface between network switches. This header structure is identical to the structure at the UNI except GFC 230 is replaced with four additional bits of VPI 240. ATM networks do not provide for flow control of the type which is implemented in some packet networks and ATM networks have no facility for storing cells over a long period of time. Therefore, inside an ATM network there is no need for generic flow control. Thus, within the NNI, GFC 230 may be eliminated in favor of an expanded VPI 240. For more information regarding standard ATM cell formats see de Prycker, pp. 124–28. One skilled in the art will recognize that the cell format described herein represents only one standard cell format and that alternative cell formats and sizes may be employed in conjunction with the present invention.

In order for switch port 110, and therefore polling station 140, to have full connectivity with each device 120 attached to communication system 100, devices 120 must pass on cells received on their respective input ports 122 to their output ports 124. As described in detail below, the present invention permits the devices to employ simple hardware forwarding of cells, which eliminates the need for costly first-in, first-out (FIFO) memories. However, FIFO memories may be utilized in alternate embodiments, also described below.

It will be recognized that an arbitrary number of devices 120 may be installed in communication system 100, with the theoretical maximum number depending on the addressing range available, as each device 120 must possess an unique address. If the eight bit VPI field 240 of a UNI format cell header 220 is used as the vehicle for addressing, this theoretical maximum will be 256. However, the accumulation of regenerative clock jitter through the transceivers at input ports 122 and output ports 124 of devices 120 creates a practical limitation on the number of devices 120 which may be placed in communication system 100. This phenomenon has been well-characterized with respect to the IBM 802.4 Token Ring standard. Thus, if 802.4 transceivers are used, as they are in the ATM25 standard, thirty-two (32) devices 120 is a sensible maximum design size. It will be recognized that those of ordinary skill in the art can readily calculate maximum desirable ring sizes for alternative physical layer implementations.

Communication along communication system 100 occurs in the following manner. A device 120 on communication system 100 will only transmit a cell on its output port 124 after receiving on its input port 122 a "token cell." The token cell is a standard ATM format cell containing some form of identifying information labelling it as a token cell. For example, the token cell may simply possess a VCI value outside the range used for addressing. Those of ordinary skill in the art will recognize that the token cell may be identified in an almost limitless number of ways, so long as it possesses a unique pattern which cannot be confused with a normal cell containing user data.

Token cells are generated by polling station 140. Polling station 140 may reside at ATM switch port 110, but in most implementations it will be a process running on a nonlocal computer maintaining one or more virtual channel connections with switch port 110 via ATM network 150. Polling station 140 periodically transmits a token cell onto ATM network 150 where it is routed to ATM switch port 110. Switch port 110 transmits the token cell onto communication link 130 from output connection 114. Of course, if polling station 140 is resident at switch port 110, the token cell will be transmitted directly onto communication link 130 without need to travel through ATM network 150.

All cells received by a device 120 on its input port 122 will be forwarded onto its output port 124. Therefore, after being transmitted onto communication link 130 by switch port 110 at output connection 114, the token cell makes a complete rotation through the loop of devices 120 and is again received by switch port 110, this time at input connection 112. At this point, the token cell may be discarded by switch port 110. Alternatively, the token cell may be returned to polling station 140 where it can be detected as a loop integrity indicator demonstrating the proper connectivity of communication system 100.

A device 120 may only transmit a cell when it has received the token cell on its input port 120. In one embodiment of the present invention, device 120 transmits by "tagging" a cell into the next free cell "slot" after the token cell. In this manner, after the token cell has passed through a series of transmitting devices 120, a chain of response cells will be created following the token cell, which will be received by switch port 110 at its input connection 112. It will be recognized that this embodiment is particularly suited for simple low-cost, hardware implementations of device 120, as no costly FIFO memories are required. Each device 120 simply retransmits the data it receives without buffering until the end of the current cell chain, whereupon it transmits its own cell.

Of course, physical layers, such as ATM25 or ATM100, which would typically be employed in conjunction with the present invention are non-slotted; therefore, special control characters are used to define the necessary cell slots. After transmitting the token cell, switch port 110 transmits a series of "idle" characters which represent the end of the cell chain. Each device 120 wishing to transmit searches for the first idle character after receipt of the token cell, while retransmitting the data on its output port 124. This character will represent the end of the current cell chain and thus, the next free cell slot. Upon detecting this idle character, device 120 converts it to a "start of cell" (SOC) character and begins transmitting its cell of data. Device 120 will complete its transmission by again appending a series of idle characters.

An SOC character is defined in the ATM25 and ATM100 standards. Likewise, an idle character is defined by the ATM100 standard and all data bytes 54 or further beyond the last SOC in the ATM25 standard are implicit idles. These definitions may be used in conjunction with the present invention. However, it will be recognized by those of ordinary skill in the art that any unique bit patterns which cannot occur within a proper ATM cell may be chosen as these characters.

It should be understood that device 120 must perform a "conversion" of the first idle character into a SOC character. Otherwise, its cell of data is likely to be overwritten by the next transmitting device 120. This conversion process requires that device 120 maintain at least a one-character buffer in its forwarding logic.

An example of this transmission method is depicted in FIG. 3, which represents the circulation of one token cell where devices 120-1, 120-3 and 120-4 have data to transmit. FIG. 3A shows the cell chain immediately after transmission of the token by switch port 110 at output connection 114. The state of the cell chain is shown in FIG. 3B after device 120-1 transmits its cell, in FIG. 3C after 120-3 transmits its cell, and in FIG. 3D after 120-4 transmits its cell. Note that an SOC character must precede the token cell as well.

In a second preferred embodiment, each device 120 stores the token cell and current appended cell chain into a FIFO buffer after receiving them at input port 122. After retransmitting the token cell at output port 124, device 120 transmits its own cell of data followed by the existing cell chain partially stored in the FIFO. In other words, in this embodiment communication system 100 acts as a register insertion ring where devices 120 always transmit their data cells immediately following the token cell. This approach is suited for use with currently existing network interfaces. No modification of interface hardware is required.

Figure 4A:
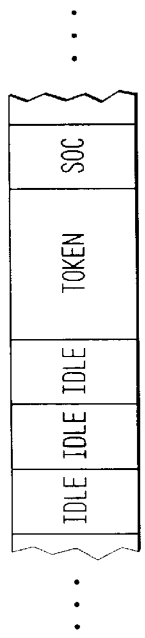
FIG. 4 (FIGS. 4A–4D) is an illustration of an example cell chain transmitted on a second embodiment of the communication system of FIG. 1 using an unslotted physical layer.
Figure 4B:
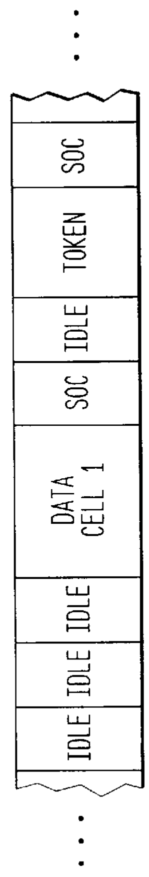
Figure 4C:
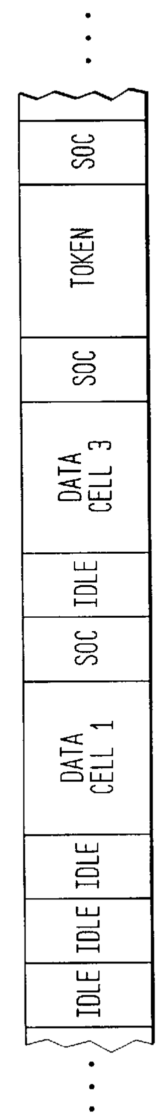
Figure 4D:
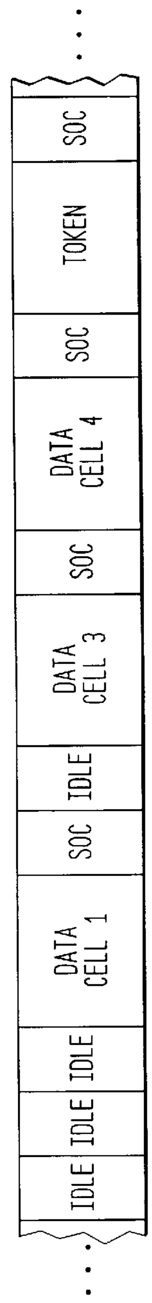
Figure 5A:
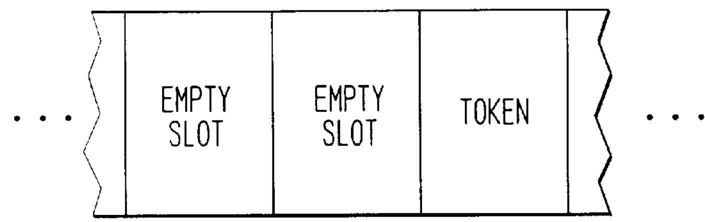
FIG. 5 (FIGS. 5A–5D) is an illustration of an example cell chain transmitted on a third embodiment of the communication system of FIG. 1 using a slotted physical layer.
Figure 5B:
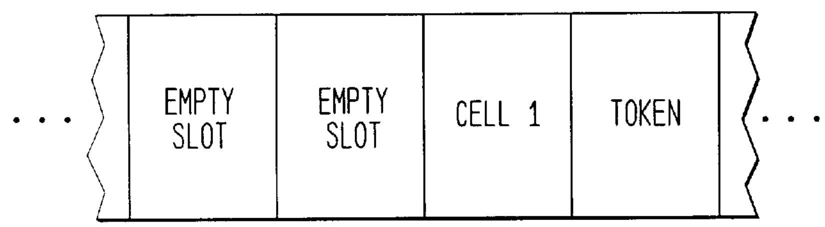
Figure 5C:
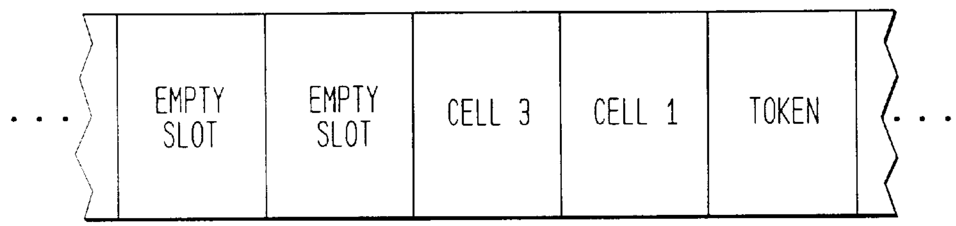
Figure 5D:
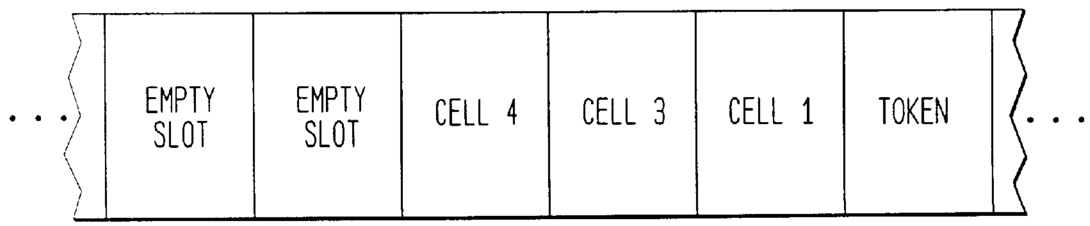
Figure 6A:
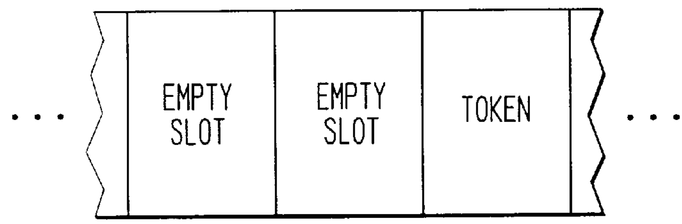
FIG. 6 (FIGS. 6A–6D) is an illustration of an example cell chain transmitted on a fourth embodiment of the communication system of FIG. 1 using a slotted physical layer.
Figure 6B:
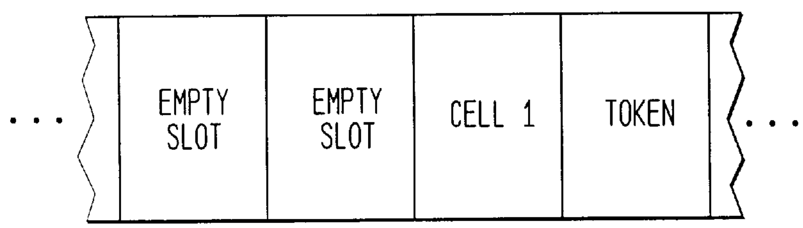
Figure 6C:
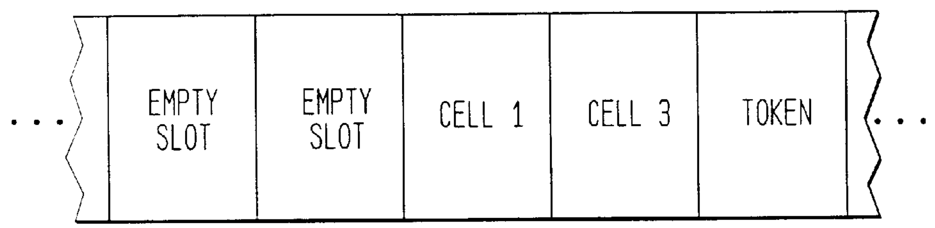
Figure 6D:
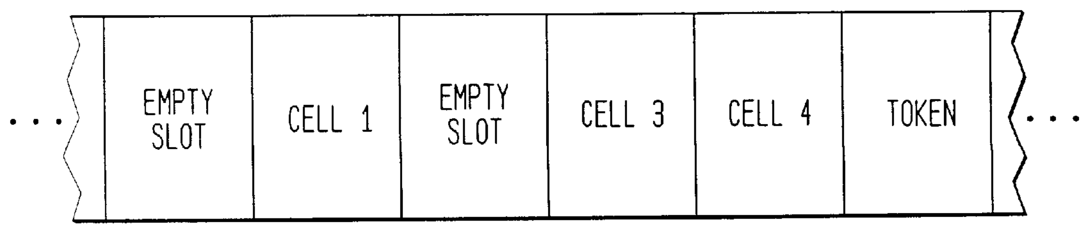

An example of this second transmission method is depicted in FIG. 4, which again represents the circulation of one token cell where devices 120-1, 120-3 and 120-4 have data to transmit. FIG. 4A shows the cell chain immediately after transmission of the token by switch port 110 at output connection 114. The state of the cell chain is shown in FIG. 4B after device 120-1 transmits its cell, in FIG. 4C after 120-3 transmits its cell, and in FIG. 4D after 120-4 transmits it cell. As illustrated in FIGS. 4B–4D, intervening idle characters between cells may be permitted in this embodiment without jeopardizing the integrity of the cell chain. The number of such idle characters should be kept small, however, as a string of idle characters can be used to detect the end of the cell chain.

The skilled artisan will recognize, however, that devices 120 employing each of the above transmission methods may be installed in communication system 100 simultaneously. Devices 120 employing the first method append cells to the end of the cell chain, as described above, whereas devices 120 utilizing the second method insert their cells immediately following the token cell.

Although the present invention would typically be used with unslotted physical media, slotted media, such as the ATM155 physical layer, can also be used. However, special control characters employed above to introduce a dynamic slot structure to an unslotted layer are not necessary when using slotted media.

FIG. 5 illustrates a third embodiment of the present invention which employs the transmission method of the above first embodiment on a slotted physical layer. Again, the illustration represents the circulation of one token cell where devices 120-1, 120-3, and 120-4 have data to transmit. FIG. 5A shows the cell chain immediately after transmission of the token cell by switch port 110 at output connection 114. The state of the cell chain is shown in FIG. 5B after device 120-1 transmits its cell, in FIG. 5C after 120-3 transmits its cell, and in FIG. 5D after 120-4 transmits its cell. As illustrated in FIG. 5, devices 120 with data to transmit simply transmit a cell in the first empty cell slot following the token cell.

FIG. 6 illustrates a fourth embodiment of the present invention which employs the FIFO buffering transmission method of the above second embodiment on a slotted physical layer. Again, the illustration represents the circulation of one token cell where devices 120-1, 120-3 and 120-4 have data to transmit. FIG. 6A shows the cell chain immediately after transmission of the token cell by switch port 110 at output connection 114. The state of the cell chain is shown in FIG. 6B after device 120-1 transmits its cell, in FIG. 6C after 120-3 transmits its cell, and FIG. 6D after 120-4 transmits its cell. As shown in FIG. 6D, devices 120 in this embodiment have some lassitude to delay transmitting, resulting in the interjection of an empty cell slot between data cells, without corrupting the cell chain.

Those of ordinary skill in the art will recognize that other transmission scenarios are possible. For instance, devices 120 employing FIFO buffers could transmit their cells before forwarding the token cell, rather than immediately following.

In all of the above embodiments, after the cell chain is received by switch port 110 at input connection 112, switch port 110 will transmit the cells to their intended destinations via ATM network 150. As the cells transmitted by devices 120 are standard ATM cells, they are treated within ATM network 150 as any other cell travelling on conventional virtual circuits through intermediate ATM switches. However, often devices 120 will comprise some array of sensors or other data collection equipment whose data must be transmitted to the same processor somewhere in the network, typically co-located with polling station 140. Therefore, bundling all of the cells onto a single virtual path for this part of their journey would be more efficient. Such a bundling can be achieved without effort where, as discussed below, a section of VCI 250 is used for addressing within the loop. If such is not the case, switches which can encapsulate and de-encapsulate virtual paths will be required. One such type of switch is the Virata™ ATM switch from Advanced Telecommunications Modules, Ltd., Cambridge, England.

After completion of this transmission cycle, polling station 140 may transmit another token cell to initiate another cycle. Those of ordinary skill in the art will recognize that polling station 140 must delay sending a token cell such time as may be required to provide for all envisaged transmissions in response to the last token cell. If the token cell is normally returned to polling station 140 then the simplest method would be to wait for return of the token cell before sending another. However, this mechanism would not efficiently employ the bandwidth available to communication system 100, so a more frequent transmission of token cells may sometimes be desirable. It should be noted that the source rate pacing function of most network interface cards can be employed to achieve proper distribution of token cells.

A number of mechanisms exist for determining the optimum frequency of transmission of token cells. For instance, polling station 140 may track the number of cells transmitted in response to token cells and increase or decrease the frequency of the transmission of token cells accordingly. Therefore, if few devices 120 are transmitting cells, the frequency of token cells may be increased by polling station 140. Alternatively, polling station 140 may assume a certain average of response cells, and set the frequency of the transmission of token cells accordingly.

It will be recognized by those skilled in the art that requiring the reception of a token cell in order to transmit data yields a form of "backpressure" flow control, as is typically found in conventional ring networks. In other words, a device 120 may not transmit a cell until the destination, here polling station 140, indicates that it is ready for data by sending a token cell.

As is apparent from the examples illustrated in FIGS. 3–6, a device 120 need not send data in response to the token cell. If a device 120 does not have data to send, it merely forwards the token cell on its output port 124, along with any data following behind the token cell.

Furthermore, although the above illustrations show devices 120 transmitting a single data cell in response to a token cell, communication system 100 could be implemented to permit devices 120 to send multiple cells consecutively in response to the token cell. The total number of cells a device 120 may transmit in response to a single token cell could be restricted by a system design policy or, alternatively, a dynamic algorithm could be employed which would guarantee that a device 120 does not consume an excessive amount of system bandwidth. Even advanced scheduling algorithms such as the Timed Token Protocol of FDDI could be implemented, though such algorithms may be prohibitively expensive for many typical implementations of communication system 100.

Devices 120 receive cells by examining the addresses of cells which pass through the ring and filtering those cells which they are interested in. Theoretically, cells intended for one or more devices 120 could be transmitted from any point in ATM network 150 to switch port 110, which would in turn place the cells onto communication link 130. However, in a typical implementation these cells will be transmitted by polling station 140 when needed, either periodically or occasionally. The skilled artisan will recognize that polling station 140 can create bandwidth for these cells simply by holding off transmission of the next token cell, although other known scheduling algorithms may be more suited for some implementations.

Addressing of devices 120 is accomplished by placing device addresses in either VPI 240 or VCI 250 in cell header 220. By using VPI 240 for device addressing, each device 120 can have access to its own virtual circuit space, including its own set of reserved VCCs (in the range 1 to 31). However, given the likely low-complexity of devices 120, many devices 120 would only need one or a few VCCs to exchange single cell messages using a custom ATM adaption layer (AAL). In this case, VCI 250 or a portion thereof could equally be used for device addressing. Therefore, in the following description the term 'address' refers to those bits in cell header 220 that are significant in a particular implementation.

Devices 120 possessing built-in identifiers may be addressed by simply placing the identifier in the address portion of cell header 220. Devices 120 without such built-in identifiers may be addressed using one of a number of methods known to those skilled in the art. However, another method particularly useful in the present invention involves algebraic manipulation of cell headers 220. In this embodiment, all devices 120 receive and transmit cells on a fixed hardwired address (such as 128). As cells are forwarded through a device 120, the forwarding logic manipulates the cell headers and adds one to the address. Using this implementation, it will be recognized that a device 120 can be addressed explicitly by using as an address a number less than 128 by the position of device 120 along the chain. Received response cells are similarly distinguished by the increment their address has encountered when received at polling station 140. It will be recognized that, if this method is used, HEC 280 must be recalculated at each device 120. Of course, a device 120 may also respond to or transmit on a promiscuous address or set of addresses which are hardwired and not translated by the forwarding logic. One skilled in the art of networks would appreciate that other implementations of algebraic manipulation would be equally effective in identifying the correct origin and destination of cells in a network of devices without built-in identifiers.

The algebraic manipulation of cell headers 220 also provides a mechanism for detecting the number of devices 120 installed in communication system 100. For example, if a token cell is defined as any cell with an address in the range 192 to 255, and polling station 140 always transmits the token cell with address 192 (or, alternatively, that is the value after final header translation in ATM switch port 110), then polling station 140 may detect the loop length by examining the received token cell address after its passage through the loop.

In the absence of this capability, polling station 140 can crudely determine the length of the ring by measuring the time it takes for token cells to traverse the ring.

As should be apparent, the use of algebraic manipulation of cell headers to address a set of devices 120 connected in series is not restricted to the network configuration shown in FIG. 1, but may be employed in other configurations as well. Indeed, it can be implemented in any system connecting devices 120 in a daisy chain, including a chain which is an open ended bus-structure, rather than a ring. For example, a number of loudspeakers or other simple output devices could be interconnected in series in an open-ended daisy chain. Sound samples or other data can be transmitted by an ATM switch port at the beginning of the chain, with an address offset determining which loudspeaker they will be played on. Sound destined for all loudspeakers can be carried on an address which is received promiscuously by the devices and passed on without modification.

It should be understood that various modifications will be readily apparent to those skilled in the art without departing from the scope and spirit of the invention. Accordingly, it is not intended that the scope of the claims appended hereto be limited to the description set forth herein, but rather that the claims be construed as encompassing all the features of patentable novelty that reside in the present invention, including all features that would be treated as equivalents thereof by those skilled in the art to which this invention pertains.

What is claimed is:

1. A communication system for connecting peripherals to an ATM network, comprising:

a plurality of peripheral devices interconnected in series by a communication link; and a switch connecting the communication link to the ATM network, the communication link beginning and terminating at the switch so as to form a ring, such that cells transmitted by any of the plurality of peripheral devices are further transmitted by the switch onto the ATM network;

each peripheral device comprising an input port for receiving data and an output port for transmitting data;

the switch comprising a duplex switch port having an input connection for receiving data and an output connection for transmitting data;

the output connection being connected via the communication link to the input port of the first of the plurality of peripheral devices;

each input port of each of the other peripheral devices being connected via the communication link to the output port of the previous peripheral device;

the output port of the last peripheral device being connected via the communication link to the input connection of the duplex switch port;

wherein each of the plurality of peripheral devices transmits data received at its input port on its output port, such that data progresses around the communication link to be received at the switch;

a token cell being transmitted by the switch onto the communication link and, thereafter, being forwarded in turn by each of the plurality of peripheral devices back to the switch;

each peripheral device having data to send transmitting a cell on its output port after receiving the token cell on its input port;

and wherein at least one peripheral device, after receiving the token cell on its input port, transmits the token cell on its output port, transmits the cells transmitted by previous peripheral devices, and then transmits its own cell if it has data to send, such that a cell chain is created which is received by the switch via the communication link;

at least one peripheral device having data to send transmitting its own cell after detecting an idle character following the token cell.

2. The communication system of claim 1 wherein the peripheral device converts the idle character to a start of cell character before retransmitting.

3. The communication system of claim 2 wherein each peripheral device transmits a sequence of idle characters after transmitting its own cell.

4. The communication system of claim 1 wherein at least one peripheral device having data to send transmits its own cell immediately following the token cell, followed by cells initially transmitted by previous devices.

5. The communication system of claim 4 wherein the peripheral device transmits a start of cell character before transmitting its own cell.

6. The communication system of claim 5 wherein each peripheral device transmits a sequence of idle characters after transmitting its own cell.

7. The communication system of claim 1 further comprising a polling station for generating token cells.

8. The communication system of claim 7 wherein the polling station is located remotely from the switch, the token cell being delivered to the switch via the ATM network.

9. The communication system of claim 8 wherein cells transmitted by any of the plurality of peripheral devices are further transmitted by the switch to the polling station via the ATM network.

10. The communication system of claim 9 wherein the token cell is returned to the polling station via the ATM network as an indication of the integrity of the communication link.

11. The communication system of claim 7 wherein the polling station adjusts the rate at which it generates token cells based upon the measured number of cells received in response to previous token cells.

12. The communication system of claim 1 wherein the switch transmits cells intended for one or more of the plurality of peripheral devices onto the communication link.

13. The communication system of claim 12 wherein each cell includes an address field, each of the plurality of peripheral devices examining the address field of each cell it receives on its input port to determine whether it is an intended recipient of the cell.

14. The communication system of claim 13 wherein the address field is algebraically manipulated by each peripheral device before transmission on the output port of the peripheral device, such that each peripheral device may be addressed according to its relative position along the communication link.

15. The communication system of claim 14 wherein the algebraic manipulation is the addition of one to the address filed.

* * * * *